United States Patent [19]

Izari

[11] 4,229,636
[45] Oct. 21, 1980

[54] SPARK EROSION MACHINING PROCESS

[75] Inventor: Gerard Izari, Montreuil Juigne, France

[73] Assignee: Cegedur Societe de Transformation de l'Aluminum Pechiney, Paris, France

[21] Appl. No.: 41,297

[22] Filed: May 22, 1979

[30] Foreign Application Priority Data

Jun. 1, 1978 [FR] France .............................. 78 17224

[51] Int. Cl.³ .............................................. B23P 1/12
[52] U.S. Cl. .............................................. 219/69 M
[58] Field of Search ................. 219/69 M, 69 E, 69 V

[56] References Cited

U.S. PATENT DOCUMENTS

| | | | |
|---|---|---|---|
| 3,727,023 | 4/1973 | Monnich | 219/69 V |
| 4,135,070 | 1/1979 | Pfau | 219/69 M |

*Primary Examiner*—Thomas J. Kozma
*Assistant Examiner*—D. A. Tone
*Attorney, Agent, or Firm*—Dennison, Dennison, Meserole & Pollack

[57] ABSTRACT

A process for the spark erosion machining of a workpiece having a cylindrical orifice, formed of any desired cross-section, the invention utilizes an electrode which is moved relative to the workpiece. According to the invention, a first rapid rough shaping pass is performed by descent of the electrode parallel to the generatrices of the orifice. On raising, the electrode is then translated perpendicularly to the generatrices by a distance r and then is lowered at a slower speed and is raised again before performing a circular translation of radius r. The electrode is again lowered and raised, and the operation is repeated n times so as to perform a complete revolution. The present process allows efficient machining of dies for metal extrusion.

12 Claims, 5 Drawing Figures

SPARK EROSION MACHINING PROCESS

BACKGROUND OF THE INVENTION

1. Field of the Invention

The present invention relates to a process for the spark erosion machining of a workpiece which has a cylindrical orifice of any cross-section, and more particularly to the spark erosion machining of a die used for the extrusion of metals.

2. Description of the Prior Art

Machining by spark erosion (or sparking) involves producing sparks through a dielectric liquid, for example a hydrocarbon, between a conducting electrode having a shape which is complementary to the removal of material to be obtained on the blank to be machined. It is known that surfaces obtained by spark erosion have a certain roughness which increases on an increase in the speed of operation (or of removal of material) of the process. Greater roughness is thus obtained by faster machining. It is known, furthermore, that the electrode used wears out in proportion with the speed selected, the wear tending to be greater when less roughness is desired. When an impression is machined by spark erosion, it is not possible to obtain immediately a sparked surface which is only slightly rough since the slow speeds required would lead to rates of removal of material which are too slow, thereby resulting in excessively long machining times. Moreover, it is not possible to obtain the corresponding shape directly due not only to the wear of the electrode during operation but also to problems with the circulation of the dielectric liquid (sometimes almost non-existent circulation or, usually, in the opposite direction to the penetration of the electrode for average or fast speeds), all these factors tending to enlarge the impression made. Thus, a cylindrical electrode generally leads to a conical impression. It thus becomes necessary to use several different electrodes each in succession for rough-shaping, semi-finishing and finishing, the last two electrodes gradually reducing the roughness and conicity of the impression owing to the use of decreasing speeds. The under-dimensioning of the successively used electrodes relative to the final impression to be obtained is smaller and smaller so as to take into consideration a phenomenon known in spark erosion as the difference between the lines of pass or of passage, which results from the minimum quantity of material to be removed by a pass made at a given speed to totally eliminate (by replacing it with a slighter one) the roughness obtained in the preceding pass at higher speed, and the working distances between electrode and workpiece for each of the two different speeds considered. It is also possible to use, with the same aim and for the same impression which preferably opens out, a long and tiered electrode having different amounts of under-dimensioning corresponding to the different speeds and pass lines selected for the rough-shaping, semi-finishing and finishing operations. If the electrode is of a complicated shape and the risk of problems in production and control as well as a high cost cannot be accepted, it is necessary to seek other solutions. Thus, it is common practice to adopt a compromise, if possible, and to make one sparking pass which is fast enough to obtain an acceptable speed, while at the same time avoiding the need for geometry and roughness which are too crude. Such a compromise produces inadequate geometry and roughness, necessitating, in the case of extrusion dies, a long and awkward filing operation to finish them off, all the more so when it takes place after the thermal treatments which are carried out after spark erosion to reduce its hardening effect, these thermal treatments obviously causing deformations.

However, various other systems have been developed to provide a better solution to certain problems encountered in the course of spark erosion and, in particular, to make several passes with the same electrode. These are systems which allow a continuous movement of lateral circular translation of radius r to be communicated to the electrode (or to the article which is to receive the impression). The radius r can be adjusted from 0 to a certain value to take into consideration the different lines of passes. Any other controlled and adjustable lateral displacements can be communicated to the electrode, and it is possible for this faculty of adjustment to be used for various purposes (to improve the machining conditions by better washing of the space between the electrode and workpiece and to improve the response to short circuits, for example) and in particular, for various stages in the progress of the spark erosion operation to replace the action of the various successive electrodes. Such systems provide the flexibility which allows practice of the following prior methods.

A first prior art method involves performing the operations of descent (firstly) and of continuous circular translation (secondly) in a manner which is completely separate in time. When the electrode is positioned in the impression which it has previously produced, the descending movement of the spindle of the machine is blocked so that it can spark by using only the continuous movement of circular translation. This movement takes place with a gradual variation of the radius r of the circle of translation which is increased from zero by increments of the order of 0.01 mm and with visual following of the progress of the work according to the state of the parameters of voltage and intensity of the sparking current until a value which has been determined beforehand as a function of the selected speeds and pass lines is reached. This value is reached in one or more stages, depending on the number of speeds used to reach the desired state of finishing. This increase is made by various means (electric or other), but on the basis of an independent manual command which can be pulsed and could only be automated using a sophisticated control device. In fact, it is necessary in any spark erosion operation for the distance between the electrode and workpiece to be permanently controlled with precision, particularly when approaching the finishing speeds. If the distance is too great, sparking does not take place and, if it is too short, a short circuit is produced between the electrode and the workpiece and it is necessary to stop the operation to clean the surfaces. Thus, without a control system, such as would exist if there was only a single descent, the work demands a permanent operator, is very awkward to supervise and only has a very slow speed relative to the average speeds of removal of material normally obtained in conventional descending work as is particularly evident in the speeds for semi-finishing or finishing operations. Another disadvantage is that, in the circular translation phase, the electrode has a fixed level and therefore transmits its own shape, including wear, to the eroded wall.

A second method involves sparking by carrying out both the operation of descent and the operation of continuous circular translation simultaneously, the value of r being constant throughout the entire descent and being adjusted before-hand as a function of the speeds and the selected pass lines, it being possible to repeat the operation several times with values of r which increase depending on the number of speeds and of passages adopted in order to reach the desired state of finishing. This method gives rise to a certain number of difficult problems which can only be solved with the aid of a sophisticated servo-control system which is integrated into the assembly. In fact, as the impression to be obtained is usually of various shapes and is usually not circular, the quantity of metal to be removed is not distributed uniformly in each of the elementary sectors which is covered by the circular translatory movement (of the electrode or of the article to be machined) to such an extent that the descent cannot be performed at the same speed in all the points of the trajectory of this movement. The depth to which the electrode has to operate consequently varies constantly along the trajectory of circular translation and, since the distance between the electrode and workpiece has to be adjusted with precision, the system which controls the descent of this distance, which normally exists on any spark erosion machine, permanently seeks the ideal value but only finds it very rarely. Under these circumstances dead times are significant and the average sparking speed is limited to a few units as a percentage of its normal value due to possible short-circuits or the abnormally high distances between the electrode and workpiece. Furthermore, the erosion of the impression is often incomplete. In fact, the differences of depths of work of the electrode tend to increase in proportion with the progress of the operation and, when the zone which is spark eroded most quickly is completed, the electrode opens into space at this point. The control of the descent of the electrode results in an increase in the speed of descent until the end of the run and this stops the operation. Since the movement of circular translation is relatively slow, the electrode and the sectors of the circle of translation where the work lags behind do not have time to harmonize to prevent this stoppage. To sum up, it can be said, in a simplified manner, that the electrode passes through the first hole which it meets on the circular trajectory and leaves its work incomplete. The above-mentioned disadvantage which is exposed in the case of an opening impression would arise almost under the same conditions for a recessed impression.

The various disadvantages mentioned in this second method, which are still more particularly perceptible in the impressions having parallel lateral faces or in the slightly conical impressions, are avoided in principle by making use as indicated above of an assembly of spark generator, apparatus for the control of circular translation, and a device for controlling the speed of descent of the electrode. The required control system is arranged to communicate with each point of the electrode over a trajectory inscribed on the surface of a cone having a vertical axis which is subjected to the machining conditions, ri, the momentary radius of giration of each point of the electrode not being perfectly constant but being controlled, the value R of the radius of the base of the cone being selected according to the requirements of the machining range (speeds and pass lines) and fixed during the entire descent, the speed of rotation around the axis of the cone being subjected to the quantity of the material to be moved over the trajectory performed.

However, such a sophisticated system cannot easily be adapted to conventional machines and therefore demands the purchase of new machines in which the circular translation device and its connections with the other functions of the assembly are initially designed in an integrated manner. The process according to the invention allows the various disadvantages mentioned above to be overcome by making use of a single electrode for the entire machining operation. It can be carried out with a boring head or circular translation head (to impart the desired movement to the electrode) or with an orbital movement work-holding chuck (to impart the desired movement to the workpiece to be spark eroded), these various materials being commercially available, or with any other system allowing controlled lateral shifting to be communicated to the electrode or to the article to be machined. It can be adapted to conventional spark-erosion machines, subject to dimensional restrictions which can possibly arise in the case of the smallest machines because it only makes use of the control of the distances between the electrode and workpiece in descent which normally exists on all machines. The present process is therefore very easy to automate.

SUMMARY OF THE INVENTION

Through use of the process of the invention, very high precision can be obtained in the desired geometry, even with an electrode which has already been used, providing that its wear is regular, as well as in the perpendicularity of the opening relative to the plane of the base of the workpiece. The roughness obtained is very slight and can disappear with conventional light and fast polishing or with machine polishing using an abrasive compound. Owing to this fact and since no significant repetition is needed, it is possible to machine thermally treated articles and to thereby eliminate the cause of deformations in quenching and possible risks of superficial decarburization. Furthermore, this process has other advantages of a general nature which can be applied more particularly to dies for extruding metals. With regard to multi-outlet dies, on the one hand, the dispersion obtained in the geometry of the various flows is very slight. With regard to dies for tubular extruded sections, on the one hand, it is possible according to the invention to produce completely the precise assembly of the die and the feeder plate (or bridge) after the termal treatment in order then to spark-erode the mounted assembly. If, however, the thermal treatments are performed after spark erosion, such will not be the case since any assembly made beforehand, will then lose all precision. Finally, it is also possible to spark erode the taper of the die with the same electrode.

The process according to the invention particularly involves performing a first fast rough pass by mere descent of the electrode parallel to the generatrices of the orifice, then raising the electrode above the workpiece, making a translation of the electrode perpendicularly to the generatrices by a distance r so that a point P arrives at $P_1$, lowering the electrode in this position into the rough orifice, raising it again, making a translation of the electrode so that $P_1$ describes an arc of a circle with centre P and radius r until $P_2$, lowering the electrode then raising it and repeating the operation n times until the translation has made a complete revolution.

According to a particular embodiment of the invention, n semi-finishing passes are made with a circular translation of radius r and n' finishing passes are made with a circular translation of radius r' in such a way that r' is slightly larger than r. It is advantageous in this case to lower the electrode into the orifice more deeply in the semi-finishing passes than in the rough-shaping pass and also more deeply in the finishing passes than in the semi-finishing passes, even causing it to issue completely below the machined orifice each time that this is possible in order to guarantee the parallelism of the sparked faces. In the finishing passes, the dielectric liquid is preferably circulated by suction, and this further improves the parallelism of the faces of the machined opening.

The invention further teaches the advantages in certain cases of making a translation of radius r at the rough speed, the semi-finishing passes being performed with a translation of radius r' and the finishing passes with a radius r". Moreover, if the idea of proceeding in three stages appears to be the most conventional, there is nothing to stop only two stages (rough-shaping then finishing) being performed, as necessary, or even a higher number of stages with a radius r having a value which is still higher than each of them and an ever-decreasing speed to obtain ever-decreasing roughness. The different values of r always depend on the speeds and the selected pass lines except in the case where the circular translation is used with an identical rough-shaping speed to the one adopted in the first rough pass made without this circular translation and where the value of r therefore only depends on the enlargement which the impression obtained is to undergo after the first rough pass. It should be noted that if this enlargement is proposed in the working range, the first rough pass may be made as desired, either in a position which is similar to that of point P or in a position which is similar to that of point $P_1$.

These and other objects of the invention will become more readily apparent in light of the following detailed description of the preferred embodiments.

DESCRIPTION OF THE PREFERRED EMBODIMENTS

Figure 1:
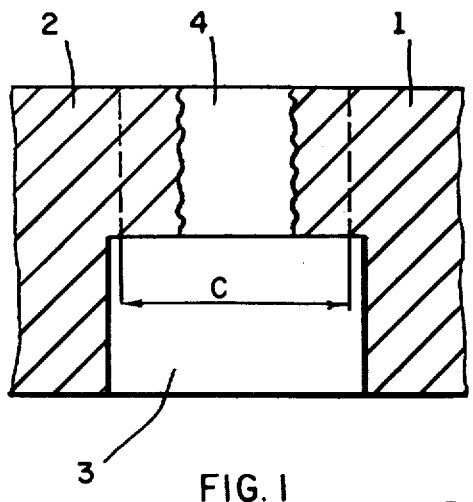
FIG. 1 is a detail sectional view of a workpiece before machining.

Referring now to the drawings and particularly to FIG. 1, it is to be understood that wear is shown in an exaggerated manner for ease of illustration. In FIG. 1, a metallic plate 1 intended for the manufacture of an extrusion die is seen to comprise a planar face 2 in which is to be produced by spark erosion an orifice of width C, the faces of which are parallel and perpendicular to the plane of the base 2 which will constitute the bore of the die and open onto a wider previously machined opening 3 which constitutes the clearance of the die. If possible, it is preferable to machine beforehand, by conventional mechanical methods, a crude preliminary hole 4.

Figure 2:
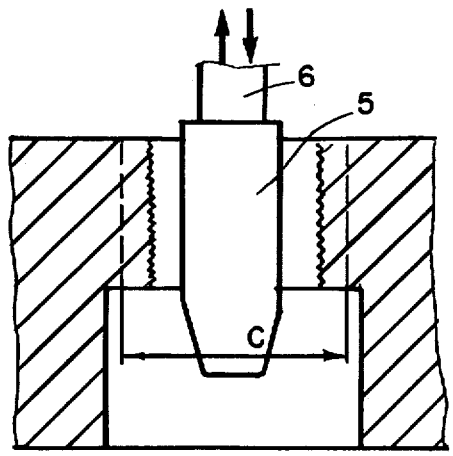
FIG. 2 is a detail sectional view of the workpiece and of the electrode at the end of the rough-shaping pass according to a first step of the present process.
Figure 3:
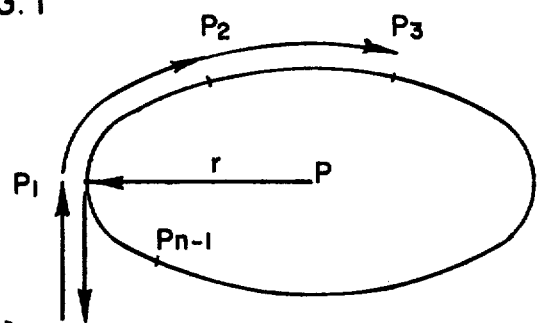
FIG. 3 is a diagram illustrating the movements of the electrode during semi-finishing operations.
Figure 4:
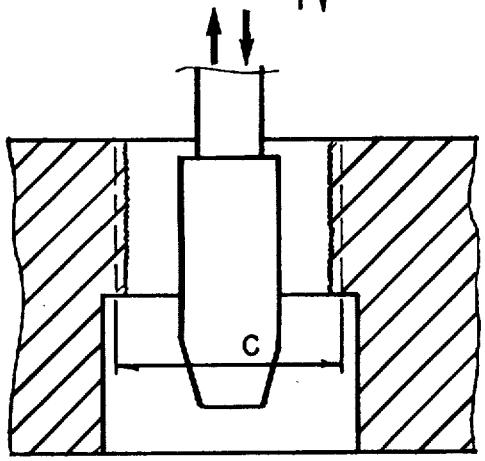
FIG. 4 is a detail sectional view of the workpiece and of the electrode at the end of the semi-finishing passes; and, FIG. 5 is a detail sectional view of the workpiece and the electrode at the end of the finishing passes.

As illustrated in FIG. 2, a first rough sparking operation is then performed for which purpose an electrode 5 is centered in the axis of the orifice to be machined, which axis is referred to as the main axis of advance 6. The electrode 5 then descends along the axis 6 until its lower end penetrates into the opening 3 by a value which is slightly larger than the height of the zone exhibiting wear. This first pass takes place as quickly as possible by selecting a speed using all the power allowed by the machine or, more frequently, all the power permitted by the fineness of the electrode or certain other details. As can be best understood by also referring to FIG. 3, the electrode is then raised above the workpiece and translation is performed perpendicularly to the axis 6 in such a way that a point is located at $P_1$ at a distance r. The semi-finishing operation which will take place at an average speed will then be commenced. The electrode descends parallel to the axis 6 to a lower level than for the rough pass so that is can work with a new portion and, after a rise outside the workpiece, circular translation of this electrode is performed so that the point $P_1$ is located at $P_2$ on the circle with centre P and radius r located in a plane perpendicular to the axis 6. The operation is then repeated n times so as to describe the entire circle with centre P and radius r by successive arcs of a circle. The arcs $P_1$, $P_2$, $P_2P_3$, ... $P_{n-1}$, $P_n$ can be as small as desired. As an example, n can be of the order of 20 for the semi-finishing operation. Since the period for which the electrode rises at high speed is insignificant in relation to the time for descending work, a yield of from 75 to 95% will be achieved relative to the method which would involve removing the same quantity of material in only one single descent (for example with an electrode having an extra thickness equal to the value r over all its lateral faces relative to the one used in the process).

Figure 5:
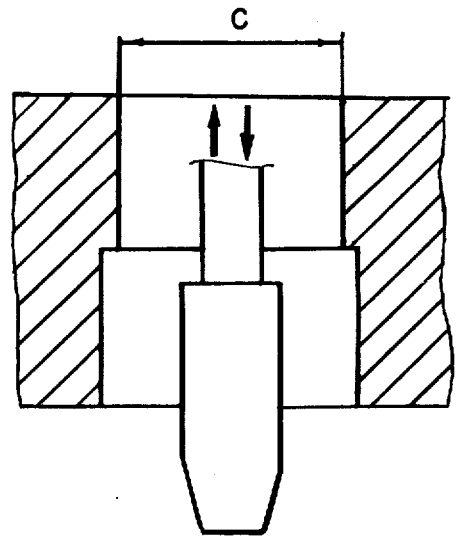

The same method is adopted for the finishing passes illustrated in FIG. 5 but at a slower rate and with a radius r' which is slightly larger than r so as to take into consideration the difference between the selected lines of passage and between the speeds adopted. It is preferable to use movements of translation with slightly shorter arcs, the number of passes being, for example, of the order of twice n. With n' of the order of 40, bores are obtained which exhibit no signs of discontinuity in view of the smallness of the radii used and which have geometric precision of the order of 100th of a millimeter. Furthermore, it is advantageous to select n and n' so as to have sufficiently small steps between each pass in order to reduce the risks of short-circuits and to regularize the removal of material, the value of these steps being related to the distance between the electrode and workpiece at the selected sparking speed.

For easier understanding, the detailed description of the process has been given voluntarily only in the case of the boring head or circular translation head allowing the movements of circular translation to be communicated to the electrode in a plane which is perpendicular to the axis 6. In the case of a work-holding chuck with orbital movements, the movements of circular translation of the electrode are replaced by those of the workpiece to be spark-eroded, but the principle of the process and the results obtained are exactly the same. The same also applies to any other system allowing a controlled lateral displacement to be communicated to the electrode or to the workpiece to be machined.

The average roughness obtained can be as slight as the one of which the sparking machine used is capable, providing the roughness of the lateral faces of the electrode itself is sufficiently slight. It is, however, possible to regulate the process so as to avoid prohibitive operating periods and to allow for example, an average roughness of 2 mu CLA to be obtained. This grain can easily be removed by conventional light polishing, but also by a short polishing treatment on a polishing machine with a grinding compound. These results are obtained due to optimization of the speeds and the passage lines used for spark erosion which allow the under-dimensioning of the electrode relative to the impression to be obtained and the values of r and r' to be determined. The need to limit the wear of the electrode as much as possible also enters into the choice of speeds.

It is observed that, during the finishing operation, the electrode descends even lower than in the semi-finishing operation and even until it extends completely beneath the spark-eroded orifice (it being necessary to perform this each time that it is possible) so that the work of the electrode does not stop at the level of the zones of its lateral faces which have been worn by the preceding operations or the operations but proceeds and ends beyond these zones. The bottom zone of the electrode corresponds to the portion which has been worn during spark-erosion of the blank, the following zone corresponds to the part worn during the semi-finishing operation, the next following zone corresponds to the portion worn slightly during the finishing operation and the upper zone corresponds to a portion of the electrode which is still intact. The fact that the above precautions are taken allows all the finishing to be performed with the upper portion of the lateral faces of the electrode. This portion can have remained still partially new at the end of the finishing operation if the electrode has been designed high enough or otherwise remains more or less thicker (less worn) than the lower zones and, in fact, very close to its original dimensions. Therefore, excellent perpendicularity and excellent parallelism of the faces of the eroded orifice can be obtained.

The present method assumes that the electrode has been produced with perfectly parallel lateral faces which are, of course, perpendicular to the parallel planes comprising its lower face and upper face, that it has been mounted on the spindle of the machine in a position which is perfectly perpendicular to the table (or, if preferred, parallel to the displacement of the spindle), and that it is fixed by a suspension means whose thickness are slighter at all points than the corresponding ones of the electrode so as to allow penetration, without damage, into the orifice which has already been spark eroded, it being possible to produce this fixation in most cases. The geometric characteristics given above are generally well maintained on an electrode which has already been used because the method adopted (complete passage of the electrode in the orifice and advance by small steps) leads to wear in the finishing operation which is moderate, uniformly distributed in the horizontal plane and in a manner which is quite parallel in the sense of height as this allows the electrode to be re-used from 2 to 15 times depending on the circumstances, with good accuracy with regard to the geometry obtained and slight dispersion of the various dimensions of the orifices produced. It is, furthermore, these criteria of distribution of wear or of non-deformation of the electrode which lead or do not lead to a decision to scrap it.

The parallelism and the perpendicularity of the bores are further improved by circulating some dielectric liquid by suction during the finishing operation. This method is awkward to employ because it produces gases which are difficult to evacuate by conventional means. These gases accumulate in the gaps or tapers and tend to cause small explosions which are sufficient to displace the workpiece or electrode by several hundredths of mm and this immediately destroys the precision of the work under operation. This disadvantage can be overcome by incorporating into the work cycle of an adjustable period a step of degassing by withdrawal towards the top of the electrode as this is sufficient to eliminate the risks of explosion.

Under these conditions, the perpendicularity of the faces of the orifice relative to the plane of the base of the workpiece and, consequently, the parallelism of these faces among themselves are obtained with a pecision which is comparable to that of the displacement of the spindle of the machine. With numerous machines, if the perpendicularity of this displacement relative to the table is respected with a discrepancy of less than 0.02 mm/m, it is possible to obtain on the spark-eroded die a conicity which is quite negligible on the scale of the maximum normal lengths of bore of the order of 20 to 30 mm. These very good tolerances of perpendicularity allow the spark-erosion of an impression which widens throughout the thickness of the piece to be machined in a direction which is unimportant relative to the two faces on which it opens. With regard more particularly, to dies for the extrusion of metals, the direction of spark erosion allowing the most comfortable working conditions is selected. In the case of dies for solid extruded sections, this direction is usually the one shown in the drawings, that is to say, the direction of passage of the metal in the die. However, there is nothing to prevent the use of the other direction if necessary, that is to say by making the electrode enter through the release side. This is the possibility which is actually used in so-called "bridge" dies for tubular-shaped sections which have been spark eroded when the assembly is completely mounted since, in this case, the only access possible for the electrode is in the opposite direction to the direction of passage of the metal in the tool. Spark erosion in the opposite direction to the direction of extrusion also allows the spark erosion of the taper to be incorporated with the same electrode at the most suitable point in the machining range of the die instead of producing this portion beforehand by conventional machining methods. Under these circumstances, the complete orifice, bores and tapers can be produced by spark erosion, either directly in the mass or from a crude preliminary hole. The taper can be spark eroded with a rough-shaping speed which is as fast as the machine or the electrode will allow because this portion of the die does not require the same precision as the bores, but, if desired, a semi-finishing stage can be added. The taper can be produced with a vertical and rectilinear generatrix but, if it is to be opened more widely at the outlet of the die, it can be produced in a staged manner. In either case, it is sufficient to select values of r as a function of the enlargement represented by the taper to be obtained relative to the dimension of impression which the electrode can give.

The precision of the dimensions of the orifice can be of the order of 100th of a millimeter, even with an electrode which has been used several times and exhibits a certain amount of wear corresponding to the criteria set out above. In fact, in order to correct the effect of this wear, it is sufficient to use radii r and r' which are increased by the value of the lateral wear, and an orifice is obtained whose dimensions are virtually identical to those of the first orifice produced by the electrode. This possibility is very important in order to respect the close tolerances of the orifices or of certain portions of them (search for good centering) and also for the multi-outlet tools where the various openings can be obtained with a very slight dispersion in their dimensions, this being of great importance for good operation of the die. It should, however, be emphasized that the precision of the dimensions of the orifice obtained can only be relative to that of the dimensions of the electrode and that, for the same reasons as what has been said with regard to the parallelism of its lateral faces and with regard to its positioning, all the necessary care should be taken when producing the dimensions of this article.

It should be observed that the step by step work and the possible withdrawal of the electrode for degassing purposes assist good washing of the space between the electrode and workpiece by the dielectric.

Due to the surface quality and the fineness of the grain obtained, the process according to the invention allows work to be carried out on thermally treated tools. If the thermal treatment has been performed in a salt bath, the presence of residues of salts on the path of the electrode seriously disturbs the course of spark erosion. Spark erosion is not produced at points where there is salt, but the machine continues its descent so that the electrode comes into contact with the salt and is displaced or deformed while continuing its work elsewhere on a deviating trajectory so that the workpiece becomes unrepairable. The workpieces therefore have to be thoroughly cleaned after the thermal treatment, or the thermal treatment has to be performed under a neutral atmosphere or under vacuum.

The process according to the invention can be carried out by using a known boring or circular translation head, or a commercially available work-holding chuck with orbital motion, or again any other system, each comprising a motor unit transmitting either to the electrode or to the workpiece to be spark-eroded a movement of circular translation or any other controlled lateral displacement, it being possible to adapt these devices to conventional spark-erosion machines, subject to dimensional restrictions which can possibly arise for the smallest ones.

Using conventional means, it is very easy to divide the movement of the system of circular translation into adjustable elementary steps and to combine them with the movements of the spindle of the machine so as to obtain automation which ensures the operating cycle, repetition of the cycle allowing a complete revolution of translation to be performed. The machines are stopped at the end of this revolution, thereby to allow the possibility of interposing, if necessary, a degassing sequence of variable frequency by the methods of the process described above. The link between the rough and semi-finishing phases on the one hand then semi-finishing and finishing phases on the other hand obviously remains in the field of manual control, leaving the operator the choice of adjustment needed.

In view of the foregoing, it is to be understood that the invention can take a number of forms. Accordingly, the scope of the invention is to be limited only by the definition provided by the following claims.

What is claimed is:

1. A process for the spark erosion machining of a workpiece having a cylindrical orifice of any given cross-section, the process being effected by means of a single electrode which is displaced relative to the workpiece, the process sequentially comprising the steps of:
   making a first rapid rough pass relative to the workpiece by causing the electrode to descent through the orifice parallel to the generatrices of the orifice to spark erode surfaces of the orifice;
   raising the electrode;
   translating the electrode perpendicularly to the generatrices by a distance r so that a point is located at $P_1$ on the surfaces of the orifice;
   lowering the electrode into the rough orifice parallel to the generatrices;
   rasing the electrode;
   translating the electrode to a point located at $P_2$ on the surfaces of the orifice;
   lowering the electrode parallel to the generatrices;
   raising the electrode; and
   repeating the translation, lowering, and raising steps n times until the translation has made a complete revolution.

2. A process according to claim 1 wherein the descent of the electrode after translation takes place at an identical speed or slower speed than the descent of the electrode during the rough pass.

3. A process according to claim 1 wherein the process is comprised of at least one semi-finishing stage with n spark erosion passes and circular translation of radius r and at least one finishing stage at a lower speed with n' spark erosion passes and a circular translation of radius r', n' and r' being greater than n and r respectively.

4. A process according to claim 3 wherein the electrode descends deeper into the orifice during successive stages of rough-shaping, semi-finishing and finishing.

5. A process according to claim 4 wherein the electrode extends completely beneath the spark eroded orifice thus produced.

6. A process according to claim 5 wherein structure mounting the electrode is of a smaller cross-section than that of the electrode so that the mounting structure penetrates into the spark eroded orifice.

7. A process according to claim 1 wherein the translation between $P_1$ and successive points established during successive passes, the points being $P_2 \ldots P_{n-1}$ and $P_n$, is along a circular path.

8. A process according to claim 1 wherein the workpiece to be machined is subjected to a movement of lateral translation while the electrode only moves longitudinally.

9. A process according to claim 1 wherein a dielectric liquid is circulated by suction during the finishing operation.

10. A process according to claim 9 and further comprising, during finishing operation, degassing with adjustable periodicity by withdrawal toward the top of the electrode.

11. A process according to claim 1 wherein the process is carried out on workpieces which have been subjected to a preliminary thermal treatment.

12. A process according to claim 1 and further comprising after machining by spark erosion, subjection of the workpiece to polishing.

* * * * *